May 4, 1965 M. B. MANLOVE 3,181,248
WHEEL ALIGNMENT APPARATUS
Filed March 19, 1963 5 Sheets-Sheet 1
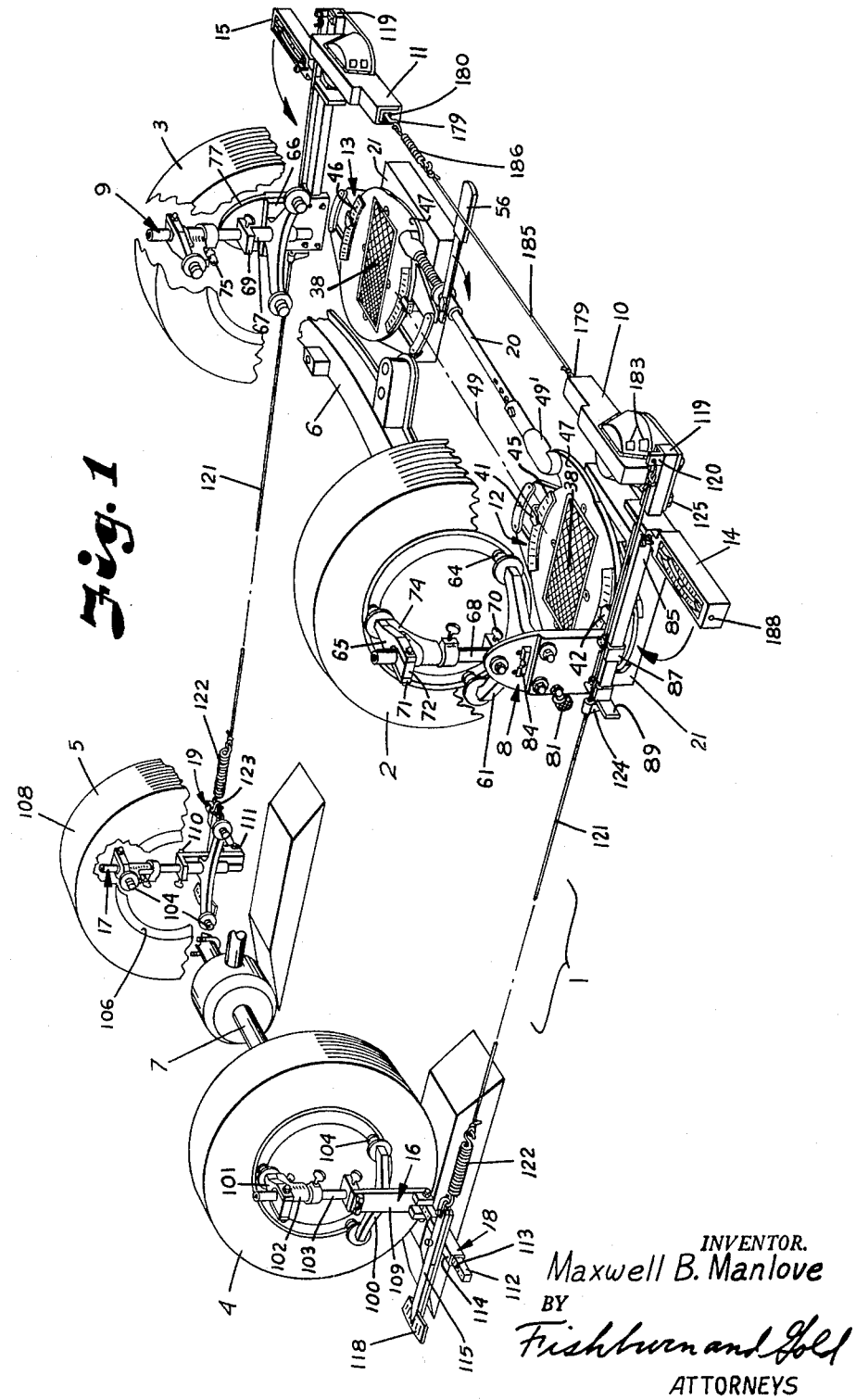
INVENTOR.
Maxwell B. Manlove
BY
Fishburn and Gold
ATTORNEYS

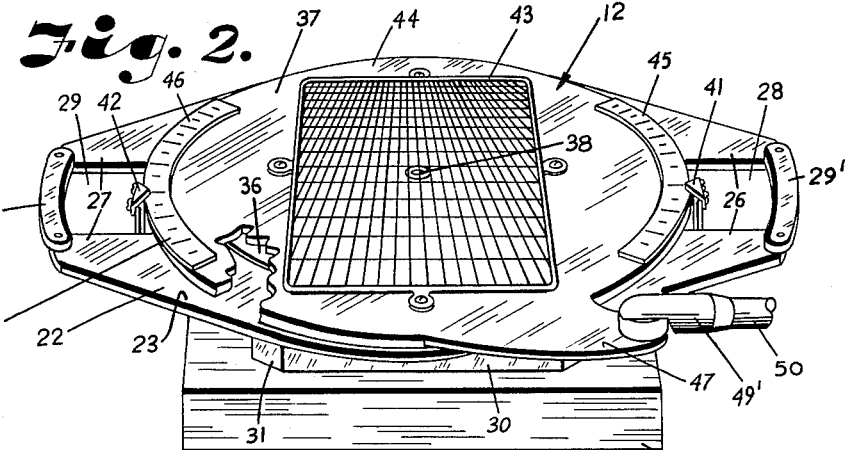

May 4, 1965  M. B. MANLOVE  3,181,248
WHEEL ALIGNMENT APPARATUS
Filed March 19, 1963  5 Sheets-Sheet 3
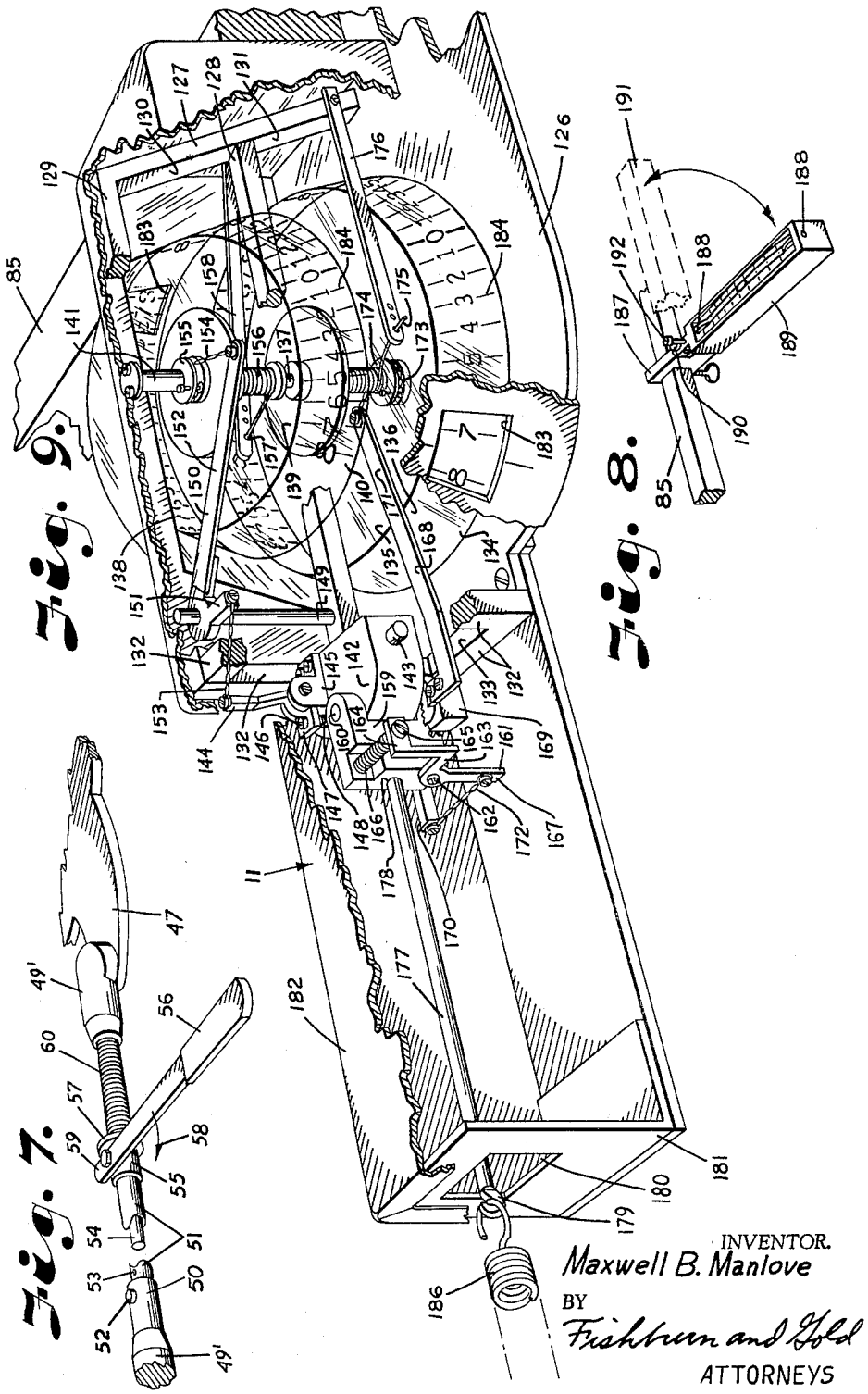
INVENTOR.
Maxwell B. Manlove
BY
Fishburn and Gold
ATTORNEYS

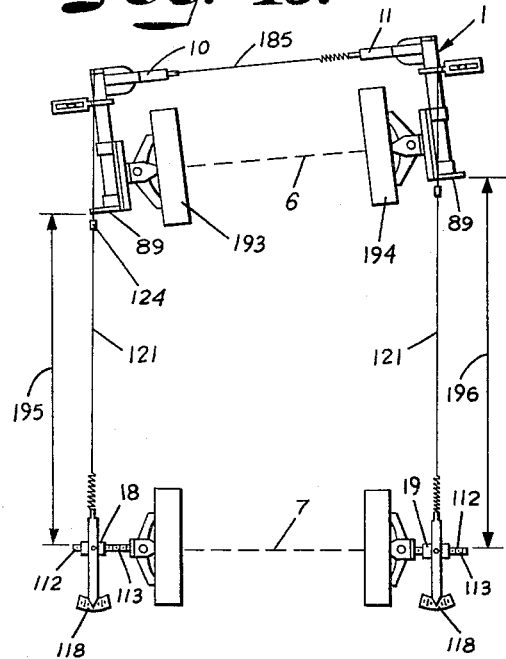
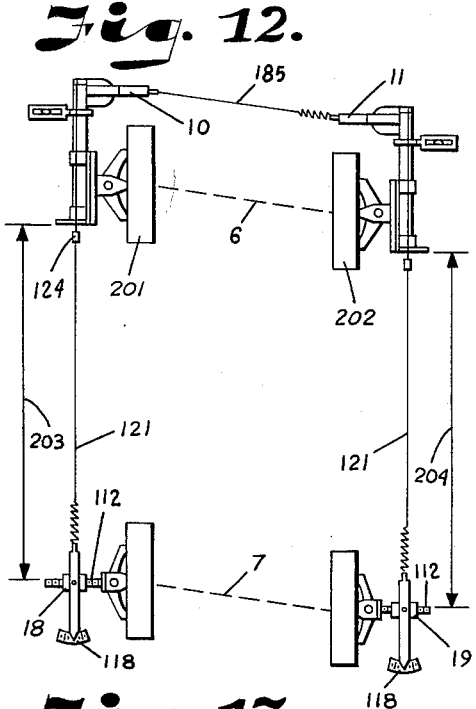
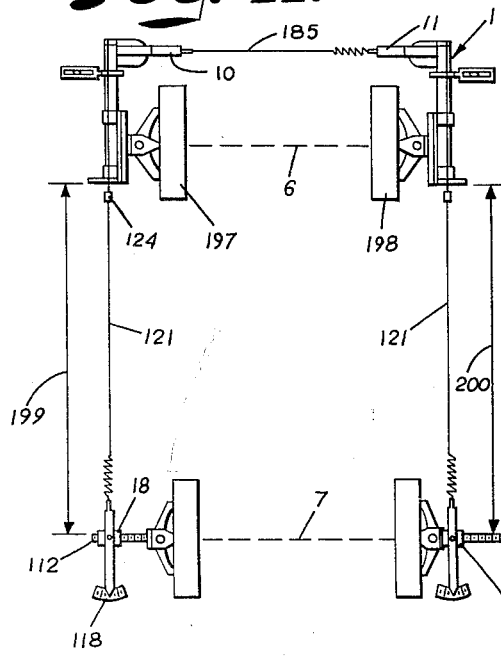
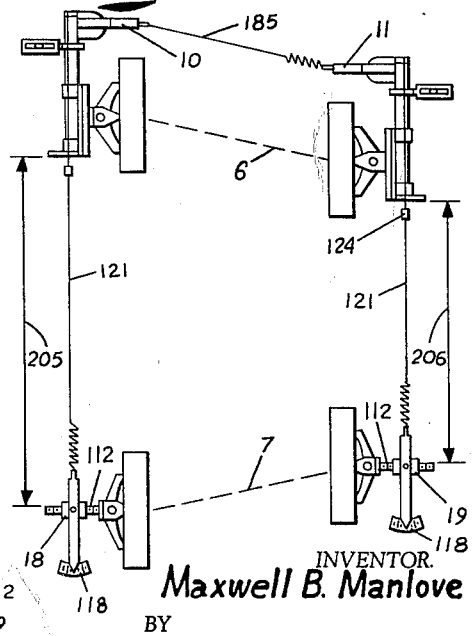
INVENTOR.
Maxwell B. Manlove
BY
Fishburn and Gold
ATTORNEYS May 4, 1965
M. B. MANLOVE
3,181,248
WHEEL ALIGNMENT APPARATUS
Filed March 19, 1963
5 Sheets-Sheet 5
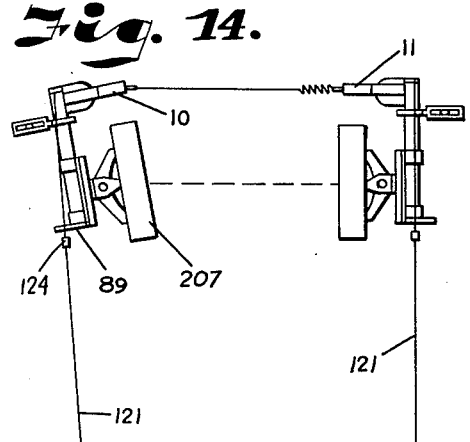
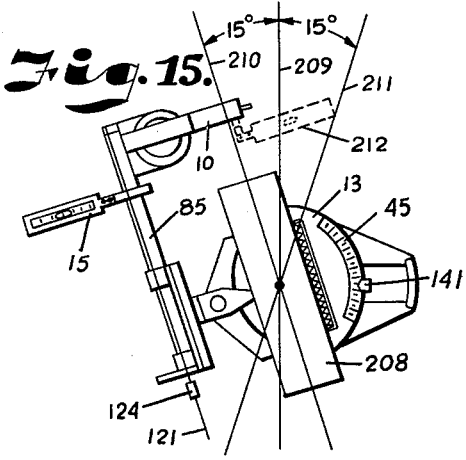
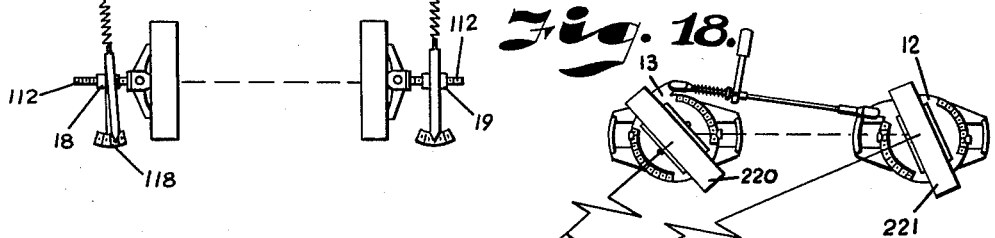
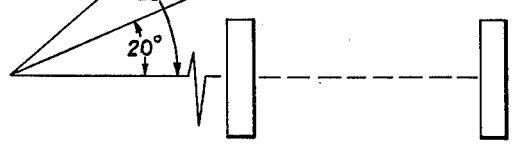
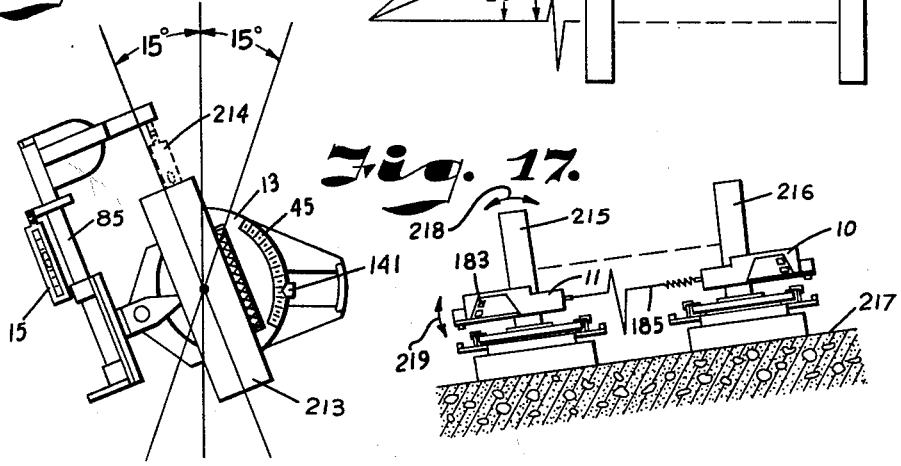
INVENTOR.
Maxwell B. Manlove
BY
Fishburn and Gold
ATTORNEYS

United States Patent Office 3,181,248
Patented May 4, 1965

3,181,248
WHEEL ALIGNMENT APPARATUS
Maxwell B. Manlove, 1724 Kansas Ave., Topeka, Kans.
Filed Mar. 19, 1963, Ser. No. 266,277
11 Claims. (Cl. 33—203.18)

This application is a continuation-in-part of United States patent application Serial No. 191,540, filed May 1, 1962 for "Wheel Alignment Indicating Apparatus."

This invention relates to new and useful apparatus for gauging the alignment of the wheels and frame of an automobile type vehicle.

The principal objects of the present invention are: to provide improved mechanical apparatus for the purpose of checking the alignment of the wheels and condition of the chassis or frame of wheeled vehicles; to provide such apparatus whereby the alignment check may be performed with greater accuracy, speed and convenience than heretofore; to provide such apparatus which is more easily calibrated and retains accurate calibration under constant use; to provide such apparatus having improved freely universally movable turntables upon which the front or dirigible wheels of the vehicle may rest during the alignment check; to provide such apparatus which does not require a gravitationally leveled supporting platform and wherein reading indications may be observed simultaneously from several vantage points; to provide an improved dirigible wheel supporting turntable assembly which includes a toe-out thrust simulating spreader bar which is more easily operated than heretofore; to provide an improved method of locating the relative positions of the front suspension cross-member and rear axle as well as determining a bent or distorted frame on a vehicle; to provide an improved method of checking caster and kingpin inclination of dirigible wheels; and to provide vehicle alignment measuring apparatus which is relatively inexpensive in construction while rugged and reliable in use.

Other objects and advantages of this invention will become apparent from the following description taken in connection with the accompanying drawings wherein are set forth by way of illustration and example certain embodiments of this invention.

FIG. 1 is a fragmentary perspective view of the improved apparatus embodying this invention installed on a set of vehicle wheels.

FIG. 2 is a fragmentary perspective view on an enlarged scale showing a dirigible wheel supporting turntable device.

FIG. 3 is a perspective view on an enlarged scale of the underside of the turntable device of FIG. 2.

FIG. 4 is a perspective view on an enlarged scale showing the rear of a front wheel mounting member.

FIG. 5 is a fragmentary perspective view on an enlarged scale showing the front of the wheel mounting member of FIG. 4.

FIG. 6 is a perspective view on an enlarged scale of a rear wheel mounting member engaging a fragmentary portion of a wheel hub and also showing a tracking or deflection measuring device associated therewith.

FIG. 7 is a fragmentary perspective view on an enlarged scale of a toe-out thrust applying device used with the wheel supporting turntables illustrated in FIGS. 2 and 3.

FIG. 8 is a fragmentary perspective view on an enlarged scale illustrating a displaceable spirit level device used with the apparatus of FIG. 1 for checking kingpin inclination and caster.

FIG. 9 is a perspective fragmentary view on an enlarged scale with parts broken away illustrating a toe and camber indicating mechanism associated with the front wheel mounting member of FIGS. 4 and 5.

FIG. 10 is a plan partially diagrammatic view of the apparatus installed on the wheels of the vehicle having a front cross-member with one end thereof pushed back.

FIG. 11 is a plan partially diagrammatic view of the apparatus installed on the wheels of a vehicle having rear wheels which do not track properly.

FIG. 12 is a plan partially diagrammatic view of the apparatus installed on the wheels of a vehicle having a "diamond-shaped" frame.

FIG. 13 is a plan partially diagrammatic view of the apparatus installed on the wheels of a vehicle having a defect known as "swayed frame."

FIG. 14 is a plan partially diagrammatic view of the apparatus installed on the wheels of a vehicle having one wheel in toe misalignment.

FIG. 15 is a fragmentary partially diagrammatic view showing the apparatus mounted on a vehicle left dirigible wheel for checking caster.

FIG. 16 is a plan fragmentary top partially diagrammatic view of the apparatus installed on the left dirigible wheel of a vehicle for checking kingpin inclination.

FIG. 17 is a cross-sectional partially diagrammatic front elevation of the apparatus used with a sloping floor and mounted on a pair of vehicle wheels for measuring the relative values of camber.

FIG. 18 is a plan partially diagrammatic view showing the apparatus supporting the dirigible wheels of a vehicle for measuring the steering geometry during a turn.

Referring to the drawings in more detail:

The reference numeral 1 generally indicates apparatus embodying this invention installed on a pair of dirigible wheels 2 and 3 and tracking wheels 4 and 5 of a vehicle having a front suspension cross-member 6 and a rear axle assembly 7. It is to be understood that the apparatus 1, prior to installation on the vehicle wheels has been calibrated by mounting on a suitable jig or the like (not shown) having gauging surfaces which are known to be in proper alignment. The apparatus 1 includes a pair of front wheel mounting members 8 and 9, indicating mechanisms 10 and 11, turntable devices 12 and 13, displaceable spirit level devices 14 and 15, rear wheel mounting members 16 and 17, deflection indicators 18 and 19, and a thrust bar 20.

Turntable devices

Referring first to the turntable devices 12 and 13, the devices are preferably but not necessarily placed on suitable support blocks 21 or the like and are not necessarily level with respect to each other as noted below. The turntable devices 12 and 13 are spaced apart a suitable distance to receive the dirigible wheels 2 and 3 respectively thereon to support the entire front end weight of the vehicle. This is most conveniently accomplished by lifting up the front end of the car by any suitable lifting device (not shown) and merely placing the respective devices 12 and 13 beneath the wheels 2 and 3 before the front end is lowered. The turntable devices 12 and 13 are mirror images of each other and the construction thereof may be understood by reference to FIGS. 2 and 3 wherein the turntable device 12 is depicted on a larger scale.

The turntable device 12 includes a generally horizontal supporting plate 22 having an upper surface 23 and a lower surface 24 and a circular central bore 25. The supporting plate 22 has oppositely disposed outwardly extending spaced apart pairs of arms 26 and 27 defining respective openings 28 and 29 on opposite sides of the central bore 25. Suitable bridging member 29 are secured across the outer ends of the pairs of arms 26 and 27 forming conveniently located handles for carrying the turntable device.

Parallel spaced apart longitudinal support strips 30 and spaced apart parallel transverse support strips 31 are secured to the supporting plate lower surface 24 in a pattern as illustrated in FIG. 3. The transverse support strips 31 form parallel guiding ways or track elements 32 extending transversely between the openings 28 and 29. A slide plate 33 of lesser vertical thickness than the support strips 30 and 31 has suitable guide edges 34 for slidably engaging the ways 32, the slide plate also slidably engaging the support plate lower surface 24 permitting restricted reciprocal movement of the slide plate transversely between the supporting plate openings 28 and 29. An elongated slot 35 is formed in the slide plate 33 and extends longitudinally between the support plate openings 28 and 29 and across the supporting plate central bore 25.

An annular or ring shaped bearing disc 36 of suitable low friction material such as bearing brass is mounted on the supporting plate upper surface 23 and surrounds the central bore 25 whereby the bearing disc 36 presents no interference therethrough. A dirigible wheel receiving turntable disc 37 is in sliding contact with the bearing disc 36. The disc 37 has a central rotatable anchor pin 38 of substantially smaller diameter than the central bore 25 and extending downwardly therethrough and also through said slide plate slot 35. An elongated indicator bar 39 is secured intermediate the ends thereof to the anchor pin 38 beneath the slide plate 33 and is movable with the turntable disc 37 in a plane parallel to the supporting plate 22 to the extent permitted by clearance between the anchor pin 38 and the edges of the central bore 25.

Spaced apart parallel guide strips 40 extend transversely of the ways 32 and are fixed to the underside of the slide plate 33. The guide strips 40 are located in sliding contact with opposite side edges of the indicator bar 39 preventing lateral movement between the slide plate and the indicator bar but permitting longitudinally movement of the indicator bar. The indicator bar moves with the turntable disc 37 to the extent permitted by cooperation between the anchor pin 38 and the slot 35. As noted above the anchor pin 38 is rotatably mounted which permits rotational movement of the turntable disc 37 with respect to the indicator bar and the slide plate 33 and the supporting plate 22.

The indicator bar 39 turns upwardly at the opposite ends thereof and extends through the supporting plate openings 28 and 29 terminating in opposite pointers 41 and 42 located adjacent the periphery of the turntable disc 37. The turntable disc 37 has a grill member 43 fixed to the central portion of upper surface 44 thereof for securely receiving the tread of a wheel tire without slipping and also indicating when the tire is approximately located in the center of the turntable disc. Circular segment scale members 45 and 46 also are secured to the upper surface 44 of the turntable disc 37 on opposite portions of the periphery thereof and are respectively associated with the pointers 41 and 42.

The above described construction of the turntable device permits complete freedom of movement of the turntable disc 37 both rotationally and in any lateral direction in a horizontal plane within the limits imposed by engagement between the edges of the central bore 25 and the anchor pin 38.

The pointers 41 and 42 move laterally in the horizontal plane in any direction along with the turntable disc 37 but are rotationally fixed with respect thereto. Therefore, any degree of angular displacement of the turntable disc 37 may be noted by the position of either of the pointers 41 and 42 in relation to the scale members 45 and 46, the angular displacement measurement being unaffected by any purely lateral movement in a horizontal plane such as that produced when the dirigible wheel of a hinged suspension system is lowered onto the turntable device.

An integral torque arm 47 forms a part of each of the turntable discs 37 and extends generally radially outwardly from the periphery thereof. The torque arms 47 of the respective turntable devices 12 and 13 each have a connecting socket 48 which, when located for an alignment check as noted hereinafter, is spaced forwardly of the vehicle dirigible wheels from a line 49 extending between the anchor pins 38 of the respective turntable devices.

Thrust bar

The thrust bar 20 is pivotally mounted at opposite ends 49' thereof in the connecting sockets 48 and includes a first sleeve 50 and an elongated sleeve 51 slidable into the sleeve 50. The sleeve 50 is adapted to receive a pin 52 which extends therethrough and into one of several aligned pin receiving bores 53 in the elongated sleeve 51 for roughly adjusting the overall length of the thrust bar 20. The sleeve 51 terminates at the end opposite the openings 53 in a collar 55 fixed thereto which pivotally supports a hand operated cam lever 56. A jam washer 57 is slidable along the telescoping rod 54 so long as the washer is perfectly square with respect thereto, however, when the washer becomes cocked it jams against the telescoping rod 54 forcing the rod 54 to move therewith. When the lever 56 is moved in the direction indicated by the arrow at 58 the end 59 thereof contacts and cocks the washer 57 so that it jams against the rod 54 and the continued motion of the lever 56 causes the rod 54 to be urged slidably outwardly of the elongated sleeve 51 thus forceably increasing the length between the ends 49 of the thrust bar 20.

A helical compression spring 60 bears against the washer 57 to square same with the rod 54 for releasing the jammed condition of the washer 57 when the lever 56 is returned to the position illustrated in FIG. 7. The elongation of the thrust bar 20 causes a slight angular rotation of the turntable devices 12 and 13 in opposite directions about the anchor pins 38 for the purpose of placing a toe-out force on the dirigible wheel steering system similar to that which is experienced during normal forward travel of the vehicle. Thus, slack on the various links of the steering system is removed under conditions which nearly equal that experienced during use of the vehicle.

Front wheel mounting members

Referring particularly to FIG. 4 the mounting member 9 is depicted which is in configuration a mirror image of the mounting member 8. The mounting member 9 includes a bifurcated structural portion 61 forming a pair of arms 62 and 63 each terminating in wheel rim engaging elements 64. A third arm 65 described more fully below also terminates in a rim engaging element 64 and the three respective rim engaging elements are located in circumferentially spaced relation and normally in a substantially vertical plane. Fixed to the bifurcated portion 61 is a rear plate 66. A generally vertical sleeve 67 is secured with respect to the rear plate 66 and slidably receives a shaft 68 which supports the third arm 65. The sleeve 67 terminates at the upper end thereof in a block 69 which threadedly receives a thumb screw 70 for bearing against and selectively locking the shaft 68 in a desired longitudinal position for adjusting the mounting member 64 on the third arm 65 to the approximate wheel rim size as described below. The third arm 65 terminates at the rear thereof in a yoke portion 71 which is pivotally mounted for vertical motion on a block 72 which is vertically slidable on the shaft 68 but may be selectively locked in a desired position thereon by a thumb screw 73. The block 72 extends horizontally forwardly of the shaft 68 forming a support 74 therebeneath. The support 74 threadedly receives a thumb screw 75 extending upwardly therethrough and bearing against the underside of the third arm 65 for urging the third arm rim engaging element upwardly under great pressure for producing tight engagement with a wheel rim.

The rear plate 66 has a front face 76 which is located in a plane extending parallel to the plane of the three rim engaging elements 64. A vertically extending front plate 77 is pivotally mounted on the block 69 at 69' for pivotal motion about an axis indicated at 78 which is substantially coincident with a vertical plane containing the rotational (spindle) axis of the vehicle wheel. The rear face of the front plate 77 slidably engages the front face 76 of the rear plate 66 for maintaining the front plate 77 in parallel relation with the plane containing the three rim engaging elements 64. A pair of slots 79 extend through the front plate 77 and receive bolts 80 extending through the rear plate 76 for insuring engagement between the rear plate 66 and front plate 77 while permitting a small degree of relative angular pivoting about the axis 78. An adjusting screw 81 is rotatably and pivotally mounted on the rear of the front plate 77 by means of an anchor member 82 but the adjusting screw 81 is longitudinally fixed with respect to the front plate 77. A socket 83 is pivotally mounted on the rear plate 66 and threadedly receives the adjusting screw 81, the adjusting screw being positioned whereby the rotation thereof pivots the front plate 77 with respect to the rear plate 66.

A spirit or bubble level 84 is mounted on the front plate 77 to provide a horizontal reference. A bar 85 rests in a horizontally extending groove 86 extending across the front plate 77 and is rigidly fixed to the front plate 77 by means of suitable strap brackets 87. The bar 85 extends in the plane of the front plate 77 in a direction forwardly of the vehicle dirigible wheels and aligned with the spirit level 84 whereby a level indication on the spirit level results in a level condition of the bar 85. The bar 85 terminates at the rear 88 thereof in an indicator scale 89 extending horizontally and transversely of the front plate 77 for a purpose described below.

*Rear wheel mounting members*

Referring particularly to FIG. 6 the rear wheel mounting member 17 is depicted which is in configuration a mirror image of the real wheel mounting member 16. The mounting member 17 includes an arm forming structural portion 111, a third arm 101, a support 102 and a vertically adjustable shaft 103 as with the front wheel mounting members 8 and 9 described above. The three arms of the rear mounting member 17 terminate in rim engaging elements 104 identical to the elements 64. One of the rim engaging elements 104 is illustrated in contact with the inner rim portion 105 of a wheel 106. The inner rim portion 105 is normally cylindrical and extends longitudinally coaxially of the wheel and receives the bead 107 of the tire 108. The inner rim portion 105 is the exposed part of the wheel (both dirigible and tracking) which is most securely grasped and most likely to be exactly coaxially located with respect to the rotational axis. It is noted that conventional alignment apparatus in this field attaches at the outer rim bead 105' which tends to vary to a greater degree from coaxial alignment than the portion 105. The arm forming portion 100 and shaft 103 are fixed to a rigid vertically extending frame member 109 having a spirit level 110 mounted thereon for indicating a vertical condition thereof.

In use the rear mounting members 16 and 17 need not be so accurately positioned vertically as the front mounting members 8 and 9 and therefore no fine adjusting means is provided. A hinge joint structure 111 is provided at the lower end of the frame member 109 and pivotally supports an elongated arm 112 in alternate positions, i.e., parallel to the member 109 for storage purposes or extending outwardly at right angles thereto as illustrated in FIG. 6. The elongated arm 112 has a linear distance measuring scale 113 thereon and, in the illustrated example, is square in cross-section. A closely fitted sleeve 114 is slidable longitudinally of the arm 112 and horizontally pivotally supports an indicating needle 115 intermediate the ends thereof on a mounting screw 116. An elongated support member 117 is fixed to the sleeve 114 and extends rearwardly at right angles to the elongated arm 112 in a horizontal plane. The support member 117 carries a circular segment scale 118 at the outer end thereof and in a horizontal plane adjacent one end of the indicating needle 115 for indicating the angular relationship between the needle 115 and the elongated arm 112. The combination of the sleeve 114 with the needle 115 and scale 118 comprise the deflection indicators 18 and 19, the purpose of which will be described hereinafter.

Referring again to FIG. 1 the front ends 119 of the bars 85 have a bracket 120 fixed thereto for receiving one end of a flexible line 121. Each line 121 is anchored at the other end thereof on a helical tension spring 122 which is in turn anchored by means of a pivotal link 123 to the end of the indicating needle 115 opposite to the end adjacent the scale 118. The springs 112 maintain the respective lines 121 in a tight or highly tensile condition whereby the lines extend in a substantially straight path and cause the needles to assume the direction of said path. A hanging pointer 124 depends from the respective lines 121 and cooperates with the indicator scales 89 for locating the position of the line 121 with respect to the rear 88 of the bars 85.

*Indicating mechanisms*

Also secured to the front ends 119 of the respective bars 85 are the indicating mechanisms 10 and 11. The indicating mechanisms are mounted to the bars 85 by suitable screws 125 and extend toward each other across the front of the respective dirigible wheels 2 and 3. The indicating mechanisms 10 and 11 are mirror images of each other and the mechanism 11 is depicted in detail in FIG. 9.

Referring particularly to FIG. 9, the indicating mechanism 11 comprises a base plate 126 having a frame 127 fixed thereto and extending upwardly therefrom. The frame 127 has parallel horizontal spaced apart rods 128 and 129 extending parallel to and cooperating with the base plate 126 forming upper and lower receiving slots designated 130 and 131. The frame 127 includes spaced horizontal and vertical rods 132 located at right angle positions or transversely of the rods 128 and 129 forming a pivot block mounting opening 133.

A toe indicating wheel 134 in the form of a horizontally extending disc 135 having a depending conical flange 136 is received in the lower receiving slot 131. The toe indicating wheel 134 has a fixed vertical central axle 137 which is rotatably mounted at the lower end thereof on the base plate 126 and at the upper end thereof on the rod 128 permitting the rotation of the wheel 134.

A camber indicating wheel 138 includes a horizontally extending disc 139 having a depending conical flange 140 which is preferably of slightly smaller average diameter than the toe wheel flange 136. The camber indicating wheel 138 is spaced above the toe indicating wheel 134 in the upper receiving slot 130 and has a vertically extending fixed central axle 141 extending coaxially of the toe wheel axle 137 and which is rotatably mounted at opposite ends thereof on the frame rods 128 and 129. The wheels 134 and 138, in the illustrated example, are of transparent or translucent material but opaque material able to contrast with scales described hereinafter is also suitable.

A first block 142 is located in the block mounting opening 133 and is pivoted to a spaced apart pair of the frame rods 132 on an axle 143 extending horizontally transversely of the axis of the wheels 134 and 138. The first block 142 is adapted for free vertical pivotal motion about the axle 143 but is restrained from motion in any other direction. An instrument arm 144 is pivotally mounted on a bracket 145 fixed to the block 142 and extends upwardly therefrom. A screw 146 extends through a horizontal foot 147 integral with the instrument arm 144 and is threadedly engaged in the block 142. A helical compression spring 148 is coiled around the screw 146 and bears respectively against the block 142 and the foot 147. The rotation of the screw 146 changes the distance between the foot 147 and the block 142 resulting in a horizontal adjustment of the position of the instrument arm 144 with respect to the wheels 134 and 138.

A vertically extending shaft 149 is pivotally mounted between the frame rods 128 and 129 in the upper receiving slot 130 and is spaced between the instrument arm 144 and the camber indicating wheel axle 141. A motion transmitting camber lever 150 is mounted on the shaft 149 and has a rigid leg 151 extending generally horizontally transversely of the instrument arm 144. A second leg 152 of the camber lever 150 extends generally horizontally to a position adjacent or near the camber wheel axle 141. A flexible instrument chain 153 is secured respectively to and extends between the instrument arm 144 and the camber lever leg 151. A flexible chain 154 is secured at one end thereof to the second leg 152 and at the other end is anchored to a pulley 155 fixed to the shaft 141. The chain 154 is maintained in the pulley 155 at least partially wrapped around the camber wheel axle 141 whereupon the downward pivoting of the first block 142 results in the horizontal clockwise rotation of the camber wheel 138 with the axle 141. A helical spring 156 is fixed at one end thereof to the camber wheel axle 141 and is anchored at the other end thereof in a selected bore 157 extending through a rigid arm 158 secured to the frame 127. Other bores 157 are spaced longitudinally along the arm 158 for varying the anchoring position of the spring 156. The spring 156 is adapted to resiliently rotatably urge the axle 141 counterclockwise against the tension of the chain 154 which is translated through the camber lever 150 and instrument arm 144 into a return force urging the block 142 to pivot upwardly.

A second block 159 is pivotally mounted on the first block 142 for restricted pivotal motion horizontally about a generally vertical axle 160. An instrument arm 161 is pivotally mounted to the block 159 by means of a screw 162 and extends downwardly therefrom. A portion 163 of the instrument arm 161 extends outwardly and upwardly from the screw 162 terminating in a foot 164 having a screw 165 extending generally horizontally therethrough and threadedly engaged in the block 159. A helical compression spring 166 surrounds the screw 165 and bears respectively against the foot 164 and the block 159. The rotation of the screw 165 causes a lateral adjusting translation of the instrument arm depending portion 167. A toe lever 168 is mounted on a portion 169 of the frame 127 for horizontal pivotal motion about a vertical axis and has one leg 170 extending generally horizontally transversely of the instrument arm depending portion 167. The toe lever 168 has a second leg 171 extending generally horizontally to a position located between the spaced apart toe and camber wheels 134 and 138 and adjacent or near the toe wheel axle 137. A flexible instrument chain 172 is secured respectively to and extends between the instrument depending portion 167 and the toe lever leg 170. A flexible chain 173 is secured to the leg 171 and is wrapped at least partially around the toe wheel axle 137 and anchored in a fixed pulley 174 similar to the pulley 155. A helical spring 175 cooperates between the shaft 137 and a fixed arm 176 in the manner described above in connection with the spring 156 and arm 158 for resiliently rotatably urging the toe indicating wheel 134 clockwise against the tension of the instrument chain 173. The tension on the chain 173 is translated into a lateral pivotal force on the block 159.

An elongated lever member 177 is rigidly secured at one end 178 thereof to the second block 159 and extends horizontally away from the wheels 134 and 138 terminating in a hook portion 179 extending through a motion restricting window 180 formed in an upstanding member 181 secured to the base plate 126. A suitable cover 182 fits over the above described indicating mechanism for protection and has suitable upper and lower windows 183 on opposite sides thereof for exposing duplicate scales 184 printed respectively on the indicating wheels 134 and 138. The windows 183 cooperate with the duplicate scales on the respective wheels 134 and 138 permitting the instruments to be read either from a position beneath the vehicle or from the outside looking toward the vehicle.

The respective indicating mechanisms 10 and 11 are positioned whereby the pivoting blocks 142 and 159 are located substantially in the lateral center of the dirigible wheels. A flexible line 185 is connected at one end thereof to the hook portion 179 of the indicating mechanism 10 and at the other end thereof is connected to an extensible spring member 186 which is in turn connected to the hook portion 179 of the indicating mechanism 11. The line 185 is thus maintained in a taut condition between the indicating mechanisms 10 and 11 and any angular motion in any direction of either indicating mechanism which brings it out of the linear path coinciding with the line 185 will result in an indication of change on the respective indicating mechanism without any substantial effect on the other indicating mechanism.

Level devices

The displaceable spirit level devices 14 and 15 are mirror images of each other and include a bracket 187 which may be selectively locked in longitudinal position on the respective bars 85, FIG. 8. The displaceable spirit level devices are pivotally mounted on longitudinally extending pins 188 in a cage 189 whereby a level condition is always maintained in a direction transverse to the direction of measurement. The cage 189 is pivotally mounted at 190 for selective swinging to a position 191 parallel to the bar 85 from a position at right angles to the bar 85 in a horizontal plane. An adjusting screw 192 extends through a portion of the cage 189 and bears against a suitable portion of the supporting bracket 187 for adjusting the spirit level device to a zero position prior to performance of the measuring or alignment checking steps described hereinafter.

Use of the apparatus

The apparatus 1 is of relatively light weight and is easily portable from place to place. The apparatus does not depend upon a perfectly level floor since the various readings as described hereinafter depend upon the relationship of the various apparatus parts to each other rather than a reference to a preleveled supporting platform. As noted above the thrust bar 20 simulates conditions of actual use since it is the inclination of wheels to thrust out (toe-out) when the vehicle is traveling in forward motion. The reading and adjustment are therefore under conditions wherein any slack in the steering and front suspension parts of the vehicle is taken out under normal conditions and by force applied on the area actually in contact with the ground which further simulates the normal condition encountered.

The adjustment screws 146 and 165 in the respective indicating mechanisms 10 and 11 permit easy recalibration of the indicating mechanisms to compensate for wear or misadjustment due to rough handling. The apparatus 1 can be easily mounted on suitable aligned gauging surfaces (not shown) for checking the calibrated condition thereof. Such surfaces may be made a part of a storage cabinet which is used for storing the apparatus during periods of non-use.

The front and rear mounting members 8, 9, 16 and 17 can be used on nearly any conventional vehicle wheels ranging from those on the smallest compact automobiles to truck and bus wheels. The apparatus is quickly mounted and accurate in use. As noted below the various readings clearly indicate what adjustments or repairs must be undertaken to correct alignment defects.

Referring to FIG. 10 there is illustrated the apparatus 1 mounted on the wheels of a vehicle which is out of alignment due to the front cross member being pushed back at one end thereof. To determine this condition the left front wheel 193 is turned to a position where the toe indicating wheel on the indicating mechanism 10 reads zero which means that the left front wheel 193 is at 90° with the front cross member 6. The deflection indicator 18 is then shifted in or out along the arm 112 until the needle centers on the scale 118. The position of the left side of the cross member 6 can be determined as a function of the reading of the indicator scale 89 associated with the left dirigible wheel 193. Note that a similar determination or check may be obtained by reference to the scale 113 on the left elongated arm 112. The same procedure may be used with the right dirigible wheel 194 and valuable information may be obtained by comparing the readings with the right elongated arm scale 113. Also important is the differences in length between the respective elongated arms 112 and indicator scales 89 as shown by the dimension arrows 195 and 196. If desired the readings may be originally taken or checked by maintaining the deflection indicators 18 and 19 equal distances from the rear wheels on the respective arms 112 and noting the deflections on the respective scales 118.

Referring to FIG. 11, the apparatus 1 is shown mounted on the wheels of a vehicle having unacceptable tracking due to the lateral displacement of either the front cross member or the rear axle assembly. Starting with the left front wheel 197, the wheel is turned until a zero toe indication is shown on the indicating mechanism 10. This positions the wheel 197 at 90° with the front cross member 6. The deflection indicator 18 is then moved along the respective arm 112 until a zero or center reading is indicated on the respective scale 118. A similar procedure is conducted with the right dirigible wheel 198 and the difference in arm position of the deflection indicator 18 is noted compared with the deflection indicator 19. This latter difference coupled with equal measurements at the dimension arrows 199 and 200 demonstrates the non-tracking condition and the severity thereof. Note that exact readings cannot be taken until the wheels 197 and 198 have been aligned in toe so that right angles exist between the lines 121 and the line 185.

Referring to FIG. 12, the apparatus 1 is illustrated mounted on the wheels of a vehicle having a defect known as "diamond frame" wherein both wheels on one side of the vehicle are displaced rearwardly with respect to the wheels on the other side. An efficient way of determining this condition is to turn the dirigible wheels 201 and 202 to the straight-ahead position whereupon the indicating mechanism 10 gives a toe-out indication while the mechanism 11 gives a toe-in indication. These latter readings coupled with substantially equal lengths at positions indicated by the arrows 203 and 204 with the deflection indicators 18 and 19 at zero deflection substantially diagnose the defect.

Referring to FIG. 13, the apparatus 1 is schematically illustrated as mounted on the wheels of a vehicle having a "swayed frame" wherein the wheels on one side of the vehicle are closer together both forwardly and rearwardly than the wheels on the other side of the vehicle. Under such conditions the indicating mechanisms 10 and 11 respectively demonstrate a toe-out and toe-in reading as with a "diamond frame" defect. However, the dimensions as indicated by the arrows 205 and 206 are different while the deflection indicators 18 and 19 read zero deflection.

Referring to FIG. 14 the apparatus 1 is schematically illustrated as mounted on the wheels of a vehicle having only the left front dirigible wheel 207 in a toe-out condition. Under such circumstances the left indicating mechanism 10 gives a toe-out reading while the right mechanism 11 indicates true forward toe alignment. Note that the toe-out condition of the wheel 207 is also demonstrated as a deflection on the scale 89 associated with the wheel 207 and the scale 118 associated with the left deflection indicator when the deflection indicators 18 and 19 are equal distances along the respective elongated arms 112.

Referring to FIG. 15, there is illustrated the various positions taken by the front dirigible wheel 208 in measuring caster. The wheel is first placed in a straight ahead position on the line 209 and the position of the pointer 41 is noted with respect to the scale 45 on the turntable device 13. By reference to the pointer 41 and scale 45 the wheel is then turned 15° out to a line 210 whereupon the spirit level device is located at right angles with respect to the bar 85 and adjusted so that the bubble reads zero degrees. With further reference to the pointer 41, the wheel is then turned 30° in to coincide with a line 211 whereupon the angular deflection of the spirit level device 15 is noted by the displacement of the spirit level bubble against a scale which is calibrated to read in degrees of positive or negative caster. If it is desired to perform the check while beneath the vehicle the spirit level device 15 may be mounted in a position indicated by the broken lines at 212 to improve the viewing location. The same procedure is conducted for the right dirigible wheel for checking the caster thereof.

Referring to FIG. 16, there is illustrated the left dirigible wheel 213 of a vehicle upon which the apparatus 1 is mounted for checking kingpin inclination. The procedure is the same as described above with respect to the caster check of FIG. 15 except that the spirit level device 15 is rotated 90° so that it extends parallel to the bar 85. Also the brakes of the vehicle are used to lock the wheel 213 against rotation during the check of kingpin inclination. If desired the spirit level device 15 may be located in a position indicated by the broken lines at 214 for greater ease of viewing from beneath the vehicle.

Referring to FIG. 17, there is illustrated the dirigible wheels 215 and 216 of a vehicle with the apparatus mounted thereon for checking relative values of camber. Note that the floor 217 is not level, however, this does not significantly effect the reading since there is no reference to the floor as a standard. The tires on the wheels 215 and 216 need not be exactly the same size, inflation and condition to conduct the check since no reference is made to the distance between the supporting floor and the wheel axle. In the illustrated example, the wheels 215 and 216 are at zero degrees camber, however, if one or both wheels demonstrated a camber inclination as indicated by the arrows 218 the respective indicating mechanism 10 or 11 would be tilted as indicated by the arrows 219 in a vertical plane containing the line 185 causing a camber reading in the respective camber indicating window 183.

Referring to FIG. 18 there is illustrated the use of the apparatus 1 for checking "steering geometry" which is relative toe-out on turns. During turns the dirigible inside wheel 220 must turn at a greater angle than the outside dirigible wheel 221 to avoid scuffing the tires. The difference in angle between the two dirigible wheels during turns may be easily demonstrated by reference to the pointers of the turntable devices 12 and 13 after noting the positions of the pointers thereof during a straight ahead position of the dirigible wheels.

Usually a vehicle will not have a single defective alignment condition but rather a combination of several, however, with practice one skilled in the art may use several simultaneous or sequential readings of the apparatus to quickly and accurately diagnose each alignment problem as well as determine when an adjustment or repair has corrected each improper condition. It is noted that the portions of apparatus 1 normally mounted on the dirigible wheels may be mounted on the rear or tracking wheels if it is desired to check the condition of toe and camber thereof.

It is to be understood that while one form of this invention has been illustrated and described it is not to be limited to the specific form or arrangement of parts herein described and shown except insofar as such limitations are included in the claims.

What I claim and desire to secure by Letters Patent is:

1. Apparatus for measuring the alignment of a vehicle frame and respectively spaced pairs of dirigible and tracking wheels mounted on the frame comprising:

(a) mounting members having scale portions and being adapted for connection to each dirigible wheel and having interconnected indicating mechanisms for directly and simultaneously indicating by reference to each other the relative angular toe and camber displacement of each dirigible wheel, (b) deflection indicating devices respectively adapted for mounting on each tracking wheel and having outwardly extending support members, supporting means on said support members and adjustable on said support members transversely with respect to the vehicle, said supporting means being operatively connected to the dirigible wheel mounting members for indicating frame distortion by reference to said scale portions and indicating mechanism, (c) turntable means supporting said dirigible wheels for steering simulation, and means interconnecting said turntable means and adapted to rotatably urge said turntable means in opposite directions for inducing normal driving toe-out thrust during use of said indicating mechanisms.

2. Measuring apparatus for indicating the alignment conditions of laterally spaced pairs of vehicle wheels comprising:

(a) a pair of wheel mounting members each having means for securing to said respective wheels, a bar fixed to each of said mounting members and extending forwardly of said respective wheels, an indicating mechanism associated with each of said wheels and respectively fixed to said bars forwardly of said wheels, said indicating mechanisms each being substantially mirror images of each other and each including, (b) a toe indicating member and a camber indicating member mounted for rotation in spaced parallel planes, a first block pivotally mounted for motion about an axis extending transversely of the rotational axis of said camber member, means connecting said first block and said camber member and adapted for rotating said camber member in response to the pivoting of said first block, a second block pivotally mounted on said first block for motion about an axis extending transversely of said first block axis, means connecting said second block and said toe member and adapted for rotating said toe member in response to the pivoting of said second block, (c) a lever member rigidly secured at one end thereof to each of said second blocks and the other end extending away from said toe and camber indicating members and toward each other, and a flexible and extensible line operably connecting said lever member other ends and extending axially of said respective lever members whereby components of transverse motion of said lever member other ends are respectively indicated by angular motion of said toe and camber members.

3. Measuring apparatus for indicating the alignment conditions of laterally spaced pairs of vehicle wheels having rims comprising:

(a) a pair of wheel mounting members, a bar fixed to each of said mounting members and extending forwardly of said respective wheels, (b) an indicating mechanism associated with each of said wheels and respectively fixed to said bars forwardly of said wheels, said indicating mechanisms each being substantially mirror images of each other and comprising frame means forming first and second receiving portions and a transverse pivot block mounting portion, (c) a toe indicating wheel in said second receiving portion and having an axle rotatably mounted on said frame means, a camber indicating wheel spaced from said toe wheel in said first receiving portion and having an axle extending coaxially of said toe wheel axle and rotatably mounted on said frame means, (d) a first block in said block mounting portion and pivoted to said frame means for motion about an axis extending transverely of said toe and camber wheel axles, an instrument arm extending from said first block, a camber lever pivotally mounted on said frame means and having one portion operatively anchored to said first block instrument arm and a second portion extending to a position accessible to said camber wheel axle, (e) a flexible tensile member secured to said camber lever second portion and wrapped at least partially around and anchored with repect to said camber wheel axle whereupon the pivoting of said first block results in the rotation of said camber wheel, means associated with said camber wheel axle and adapted to resiliently rotatably urge same against the tension of said camber tensile member, (f) a second block pivotally mounted on said first block about an axis extending transversely of said first block axis, an instrument arm extending from said second block, a toe lever mounted for pivotal motion on said frame means and having one portion operatively anchored to said second block instrument arm and a second portion extending to a position accessible to said toe wheel axle, (g) a flexible tensile member secured to said toe lever second portion and wrapped at least partially around and anchored with respect to said toe wheel axle, means associated with said toe wheel axle and adapted to resiliently rotatably urge same against the tension of said toe tensile member, (h) an elongated lever member rigidly secured at one end thereof to said second block and the other end extending away from said toe and camber indicating wheels, and a flexible and extensible line member connecting said respective lever member other ends and extending axially of said respective lever members whereby components of transverse motion of said lever member other ends are respectively indicated by resultant angular motion of said toe and camber wheels.

4. In measuring apparatus for indicating the alignment conditions of spaced apart front and rear pairs of vehicle wheels, (a) a pair of front wheel mounting members each having means terminating in circumferentially spaced wheel engaging elements, said front wheel mounting members each including a rear support fixed with respect to said elements and having a portion extending parallel to a plane containing said wheel engaging elements, (b) a front support pivotally mounted with respect to said rear support, said front support engaging said rear support portion for maintaining at least a portion of said front support in parallel relation with the plane containing said rim engaging elements, screw means cooperating between said front support and rear support whereby the rotation of said screw means pivots said front support with respect to said rear support, a spirit level mounted on said front support, a bar fixed to said front support and extending forwardly of said front wheel and aligned with said spirit level, (c) said bar terminating at the rear thereof in an indicator scale extending horizontally and transversely of said front support, (d) an indicating mechanism associated with each of said front wheels and respectively fixed to said bars forwardly of said wheels, said indicating mechanisms being interconnected and adapted to indicate components of relative transverse motion therebetween, (e) a pair of rear mounting members on said rear wheels, and a taut line extending from each of said rear mounting members to a position on said respective bar adjacent said respective indicating mechanism, said taut lines cooperating with said indicator scales at the rear of said bars for indicating relative angular positions therebetween.

5. Apparatus for supporting a pair of dirigible wheels of a vehicle during alignment checking procedures comprising:

(a) a pair of turntable devices spaced apart for respectively receiving said wheels, said turntable devices each including, (b) a generally horizontal support plate having an upper surface and a lower surface and means forming a generally central opening therethrough, spaced apart guiding ways extending horizontally transversely of said support plate on the lower surface thereof, (c) a slide plate having guide edges slidably engaging said ways, said slide plate also slidably engaging said support plate lower surface permitting restricted reciprocal movement of said slide plate transversely of said support plate, an elongated slot in said slide plate and extending longitudinally of said support plate across said central opening, (d) bearing means on said support plate upper surface and surrounding said central opening, a wheel receiving turntable disc slidable on said bearing means and having a central anchor pin of substantially smaller diameter than said central opening, said anchor pin being of a thickness approximating the width of said slide plate slot and extending downwardly through said central opening and through said slide plate slot, (e) an elongated indicator bar secured to said anchor pin beneath said slide plate and movable parallel to said support plate to the extent permitted by clearance between said anchor pin and the edges of said central opening, spaced apart parallel guide strips on the underside of said slide plate and extending transversely of said ways, said guide strips being located in sliding contact with opposite edges of said indicator bar preventing lateral movement between said slide plate and said indicator bar but permitting longitudinal movement of said indicator bar with said turntable disc, (f) said turntable disc being rotatably mounted on said anchor pin for rotational movement with respect to said indicator bar and said slide plate and said support plate, said indicator bar terminating in a pointer located adjacent the periphery of said turntable disc, and (g) a circular segment scale member on the periphery of said turntable disc and respectively associated with said pointer.

6. The apparatus as set forth in claim 5 including:

(a) an integral torque arm on each of said turntable devices and extending radially outwardly from the periphery of said respective turntable discs, said torque arms each having a connecting socket spaced forwardly of said vehicle from a line extending between said anchor pins, (b) a thrust bar pivotally mounted at opposite ends thereof in said connecting sockets, and means on said thrust bar for inducing an elongation thereof for rotating said turntable discs in opposite directions about said anchor pins, (c) said thrust bar means including a tube containing a telescoping member, a jam-washer on said telescoping member and engaging therewith when said jam-washer is slanted therewith, and a lever pivoted on said tube and adapted to selectively engage and slant and move said jam-washer for selectively telescoping said latter member.

7. Apparatus for measuring the alignment of a pair of vehicle dirigible wheels comprising:

(a) a mounting member adapted for rigid connection to each of said dirigible wheels and having interconnected indicating mechanisms for indicating by reference to the positions assumed by each other the relative positions of each of said dirigible wheels, (b) a pair of turntable means each having universal freedom of horizontal movement and respectively supporting one of said dirigible wheels, slip-resistant means operably positioned between said turntable means and said respective wheels, and (c) means interconnecting said turntable means and adapted to urge said turntable means in opposite directions for inducing normal driving thrust on the wheels during operation of said indicating mechanisms.

8. Apparatus for measuring the relative alignment of a pair of vehicle dirigible wheels comprising:

(a) a mounting member adapted for rigid connection to each of said dirigible wheels and each having an indicating mechanism, a taut line interconnecting said indicating mechanisms, (b) said indicating mechanisms each including a toe indicating member and a camber indicating member, (c) a lever member movably mounted on each of said indicating mechanisms and being secured respectively to opposite ends of said line and adapted to assume positions parallel to said line, said levers being operably simultaneously connected to said respective toe and camber indicating members for simultaneously inducing toe and camber readings on said indicating mechanisms in response to the positions assumed by said levers.

9. The apparatus as set forth in claim 8 wherein:

(a) each of said indicating mechanisms includes a housing normally fixed with respect to said mounting members and having a plurality of scale reading openings therein for exposing said toe and camber indicating members at a plurality of locations to provide alternate reading locations simultaneously.

10. Apparatus for measuring the alignment of a vehicle frame and respectively spaced pairs of dirigible and tracking wheels mounted on the frame comprising:

(a) a pair of mounting members having scale portions and respectively being adapted for mounting on each dirigible wheel, (b) deflection indicating devices respectively adapted for mounting on each tracking wheel and having outwardly extending support members, supporting means on said support members and adjustable on said support members transversely with respect to the vehicle, and (c) a taut line connecting said respective mounting members to said respective supporting means and operably associated with said scale portions for indicating frame distortion by reference to said scale portions and the positions of said supporting means on said support members.

11. A wheel mounting member for supporting alignment measuring apparatus on a wheel rim comprising:

(a) a first arm having a pair of spaced apart wheel engaging elements, (b) a second arm adapted to be fixed with respect to said first arm and located between said pair of wheel engaging elements, a wheel engaging element mounted on said second arm in a position circumferentially spaced from said first-named wheel engaging elements, (c) means for urging said last-named wheel engaging element radially outwardly for producing radial locking pressure between said respective wheel engaging elements and the wheel rim, (d) an alignment measuring apparatus support carried by at least one of said arms for movement in a plane parallel to a plane containing the wheel rim, and means operably connected between said support and at least one of said arms to induce adjusting movement of said support.

References Cited by the Examiner

UNITED STATES PATENTS

| | | | |
|---|---|---|---|
| 1,324,388 | 12/19 | Duby | 33—203.2 |
| 2,125,534 | 8/38 | Wochner | 33—203 |
| 2,190,709 | 2/40 | Friestedt | 33—203 |
| 2,197,468 | 4/40 | Graham et al. | 33—203 |
| 2,250,742 | 7/41 | Bennett | 33—203 |
| 2,261,342 | 11/41 | Darton | 33—203.14 |
| 2,275,137 | 3/42 | Friestedt | 33—203.12 |
| 2,438,358 | 3/48 | Castiglia | 33—203.12 |
| 2,689,403 | 9/54 | Wilkerson | 33—203.18 X |
| 2,972,189 | 2/61 | Holub | 33—203.2 X |
| 3,079,695 | 3/63 | Mineck | 33—203.12 |
| 3,091,862 | 6/63 | MacMillan | 33—46.2 |

FOREIGN PATENTS 612,699   11/48   Great Britain.

ISAAC LISANN, *Primary Examiner.*